United States Patent [19]

Steward

[11] 4,398,821

[45] Aug. 16, 1983

[54] INSTRUMENT FOR MEASURING ANGLES

[76] Inventor: Erle R. Steward, 21 Medway Rd., Cape Town, South Africa, 7800

[21] Appl. No.: 196,828

[22] Filed: Oct. 14, 1980

[30] Foreign Application Priority Data

Oct. 15, 1979 [ZA] South Africa .................. 79/5496

[51] Int. Cl.³ .................................. G01B 11/26
[52] U.S. Cl. .......................... 356/152; 356/143; 356/149
[58] Field of Search .............. 356/141, 143, 152, 250, 356/149, 248

[56] References Cited

U.S. PATENT DOCUMENTS

| | | | |
|---|---|---|---|
| 2,037,030 | 4/1936 | Kollmorgen | 356/141 |
| 2,155,402 | 4/1939 | Clark | 356/141 |
| 3,131,249 | 4/1964 | Kunze | 356/141 |
| 3,204,102 | 8/1965 | Hand, Jr. | 356/141 |
| 3,349,325 | 10/1967 | Bajars | 356/152 |
| 3,992,106 | 11/1976 | Auerbach | 356/141 |

OTHER PUBLICATIONS

McGraw-Hill Encyclopedia of Science and Technology, vol. 12, pp. 280, 281; vol. 13, p. 564, McGraw-Hill Book Company, 1971.

*Primary Examiner*—S. C. Buczinski
*Attorney, Agent, or Firm*—Berman, Aisenberg & Platt

[57] ABSTRACT

An instrument for measuring sun elevation which includes a structure rotating at a controlled, constant speed. By means of a magnet on said structure a pulse is produced once per revolution. This pulse forms a datum point and can coincide with the horizon. A further pulse is produced by sunlight reflected onto a photo-sensitive device by a mirror rotating with said structure. An oscillator and divider produces a train of pulses, and there is a counter which counts the number of pulses of the train between the datum pulse and the further pulse. As the number of pulses counted is a measure of the time between the further and datum pulses, and this time is a measure of the angle through which said structure has rotated, and this in turn is a measure of the angle between the sun and the horizon, the number of pulses counted can be converted electronically into a read-out of the sun angle. In another form, specifically intended to measure the elevation of a star, the datum and other pulses are produced by rotation of discs, each having a slot therein. A light is shone on each disc and there are photo-sensitive devices normally blocked-off from the sources by the discs. As the discs rotate, the photo-sensitive devices produce pulses. One light source and photo-sensitive device produces the datum pulse and are maintained in a fixed position. The other light source and device move as the instrument is tilted upwardly. This causes the spacing between the two pulses to vary in dependence on the tilt of the instrument.

5 Claims, 12 Drawing Figures

INSTRUMENT FOR MEASURING ANGLES

This invention relates to an instrument for measuring angles.

Conventional navigation, at least on small vessels, is by dead reckoning supplemented with sun or star shots to confirm the position that the dead reckoning calculations have given. On yachts and the like taking a sextant shot can be difficult due to the motion of the vessel. The horizon and the sun or star must be visible simultaneously and for long enough for the sighting to be taken.

The object of the present invention is to provide an angle measuring instrument, which can be used to determine sun or star elevation, and which is easier to use than the conventional sextant.

According to the present invention there is provided an instrument for measuring the angle subtended at the instrument between a datum position and a further position, the instrument comprising a rotatable structure having means for producing two signals one of which indicates that a specific part of the rotating structure has passed a reference point, which point represents said datum position, and the other of which signals varies in time with respect to said one signal and represents said further position, and means for producing a signal proportional to the time interval between said one and other signals.

The means for producing a proportional signal comprises means for producing a train of pulses and means for counting the pulses produced during said time interval.

In one form, the instrument includes an optical system with means for enabling the horizon to be viewed so that the instrument can be brought into a horizontal position, a rotating reflector forming part of said structure, and a photo-sensitive device for receiving light from said reflector to produce said other signal.

For a better understanding of the present invention reference will now be made, by way of example, to the accompanying drawings, in which FIG. 1 is a top plan view of an instrument for measuring angles:

Figure 1:
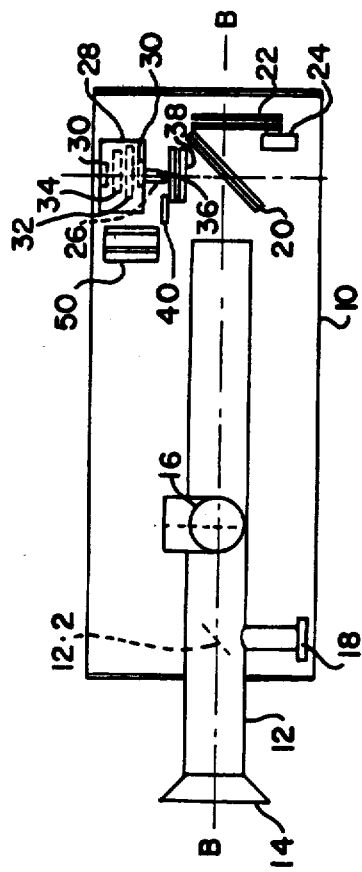
Figure 2:
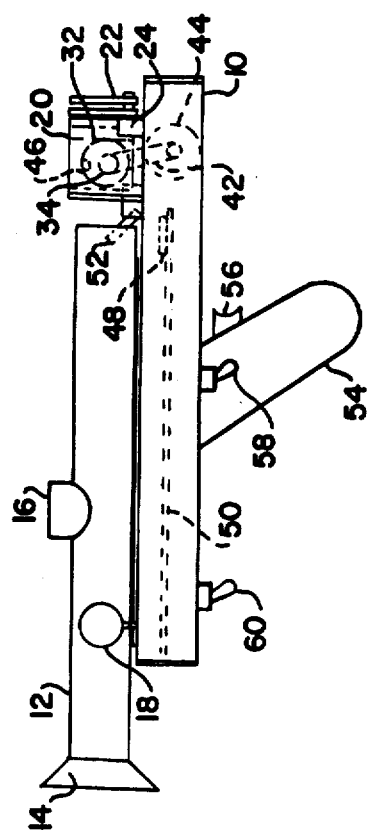
FIG. 2 is a side elevation of the instrument of FIG. 1.
Figure 3:
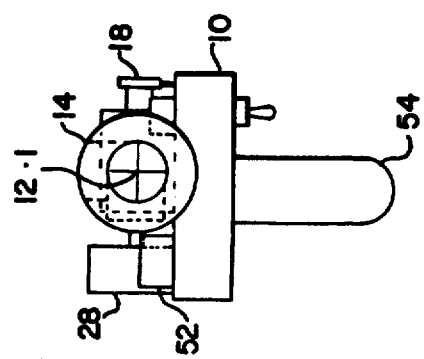
FIG. 3 is a front elevation of the instrument of FIG. 1.

The instrument illustrated in FIGS. 1, 2 and 3 comprises a housing 10, the upper surface of which forms a rigid platform on which the optical system of the instrument is mounted. The optical system comprises a telescope 12 which has a resilient eye piece 14 at the end thereof which protrudes beyond the housing 10. The telescope has horizontal and vertical cross hairs 12.1 and calibrated adjusting screws generally shown at 16 permit displacement of the cross hairs. Protruding laterally from the barrel of the telescope 12 is a unit 18 which receives a small portion of the light which enters the telescope. A one-way mirror 12.2 in the barrel of the telescope 12 reflects this portion to the unit 18 while still permitting the user to see the light. The unit includes an opto-electronic device, such as a photodiode or phototransistor.

A semi-reflective mirror 20 is mounted at an angle of 45° with respect to the line of sight B—B of the telescope 12. The mirror 20 lies between the telescope 12 and a set of filters 22 which are pivotally mounted on a support 24 and can be swung in an upward arc out of the line of sight B—B.

A shaft 26 protrudes from a sub-housing 28, the shaft 26 being carried in bearings 30 mounted on the walls of the sub-housing 28. The shaft 26 carries a flywheel 32 and a pulley 34. On that end of the shaft 26 which is outside the sub-housing 28 there is a mirror 36 the face of which lies at 45° to the shaft axis. A further set of filters 38 are provided between the mirror 36 and the mirror 20, the filters 38 being mounted on a support 40 so that they can be swung upwardly from the position shown in which they lie between the two mirrors.

The pulley 34 is connected by a belt 42 (FIG. 2) to the output pulley of an electric motor 44. It will be seen from FIG. 2 that the motor 44 is in the housing 10.

The flywheel 32 carries a magnet 46 on the periphery thereof and a coil (described in more detail hereinafter with reference to FIG. 4) is carried by the sub-housing 28. As the flywheel 32 rotates, the magnet 46 moves into and out of inductive relationship with the coil.

The reference numeral 48 in FIG. 2 designates a visual display unit which reads out, as will be described hereinafter, in degrees and minutes. The unit 48 is within the housing 10 and is mounted directly on a printed circuit board which is designated 50. There is an aperture in the top wall of the housing 10 and a mirror 52, inclined at 45°, enables the unit 48 to be viewed. The position of these components is such that when a user looks through the telescope with his right eye he can see the reflection of the unit 48 in the mirror 52 with his left eye.

A handgrip 54 extends downwardly from the housing 10 and enables the user to steady the instrument. A switch 56 is mounted on the handgrip and two further switches 58 and 60 are mounted on the underside of the housing 10. Actuation of the switch 56 causes a reading to be taken, switch 58 is a switch which enables the degree of accuracy in the speed of rotation of the mirror 36 to be checked, and switch 60 is a two-position switch. One position is an 'off position' and the other position illustrated is 'on.' The function of these three switches will be described in more detail hereinafter.

Figure 4:
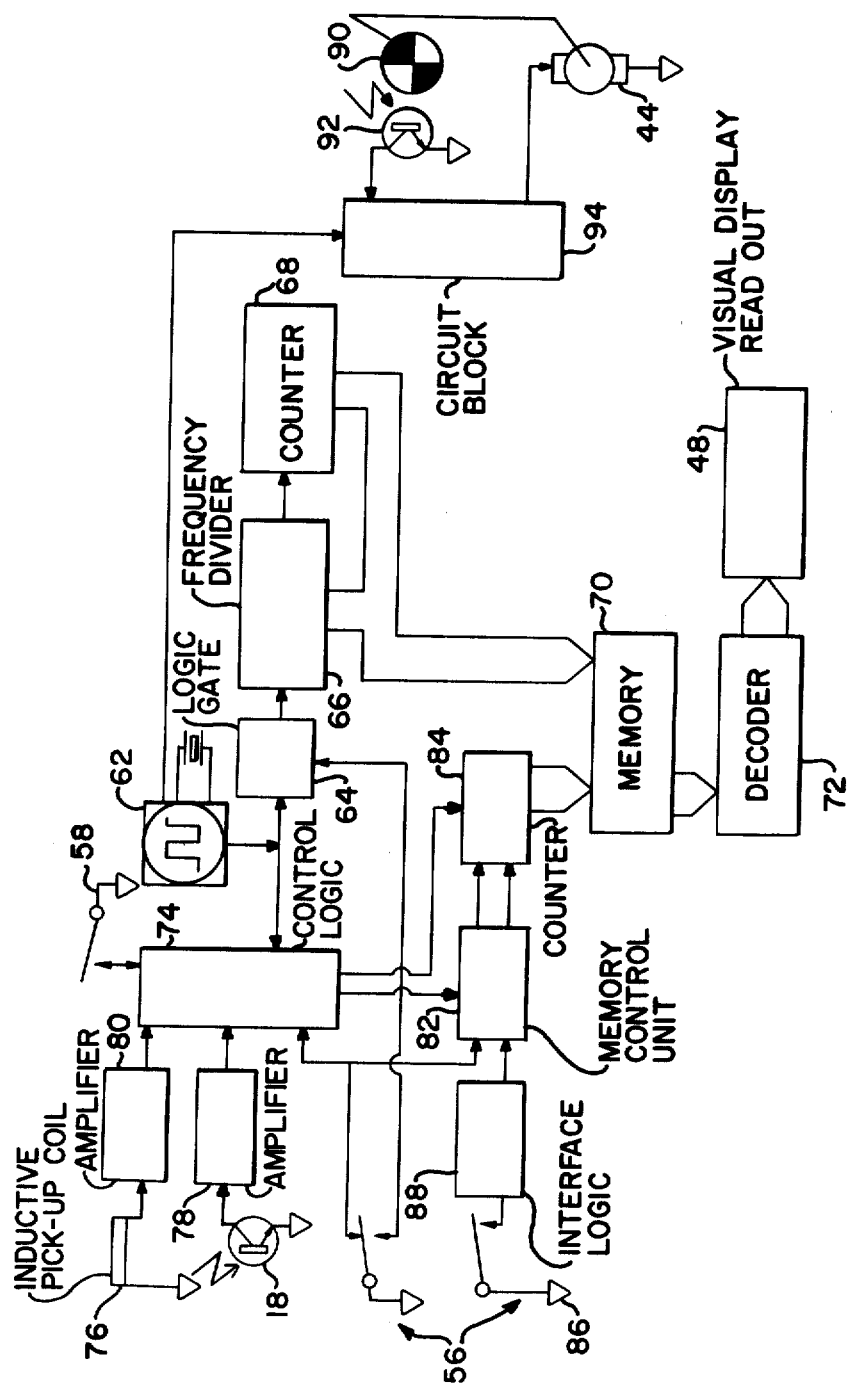
FIG. 4 is a circuit diagram.

Turning now to FIG. 4, the circuit on the board 50 is illustrated and includes a crystal oscillator 62 having an output frequency of, for example 2 MHz. This is connected through a logic gate 64 to a frequency divider 66 which in turn drives a counter 68. The output of the counter is fed to a memory 70 which is in turn connected to a decoder 72. The output of the decoder feeds the display unit 48 which, as illustrated, is a VDU but can be a printer.

The output of the oscillator 62 is also fed to control logic represented by the block 74, the block 74 additionally receiving the amplified output pulses of the unit 18 and of an inductive pick-up coil 76. The coil 76 is, as mentioned above, adjacent the flywheel 32. The amplifiers for the unit 18 and the coil 76 are shown respectively at 78 and 80.

A control unit 82 for the memory 70 is itself under the control of the block 74. Likewise, a counter 84 is controlled by the logic block 74 and the output of the counter 84 is fed to the memory 70. The switches 56 and 58 are shown in FIG. 4 but the main on-off switch 50 has not been illustrated. The switch 56 is used both to take a reading and as a re-set for the counter 84. A further switch 86 is connected through interface logic 88 to the memory control unit 82. The switch 86 is optional and has not been shown in FIGS. 1 to 3.

A part reflective/part non-reflective disc 90 which rotates with the shaft of the motor 44 is shown in FIG. 4. Light reflected from the reflective areas of the disc 90 falls onto a photoelectric cell 92 and the output pulses of the cell 92 are amplified by an amplifier forming part of the circuit block 94. This block also includes drive circuitry through which power is supplied to the motor 44 and logic circuitry which controls the drive circuitry. The disc 90 can be replaced by a toothed wheel through the teeth of which a light beam passes to fall on the cell 92.

It will be understood that, on rotation of the shaft 26, the coil 76 produces a series of pulses which, after amplification, are fed to the control logic circuitry of the block 74.

As stated above, the main on-off switch of the instrument has not been shown in FIG. 4 but this is connected between the battery and the electronic and electrical components described. When closed, it supplies power to the motor 44 through the drive circuitry in the block 94, activates the oscillator 62 and powers the remaining electronic and electrical components.

The navigational instrument described thus far is used in conjunction with a chronometer (not shown). As the user closes the main switch 60 to power the instrument, he notes the time on his chronometer. As he switches on, the unit 48 immediately displays 00°00′ and the elapsed time counting system including the counter 68 commences to run. Conveniently, closing of the switch 60 may be on the hour. Thus, if we assume that an approximate to mid-day reading is to be taken, the user closes the switch 60 at 12.00 hours. This starts the counter 68 and the output of the counter, which represents elapsed time since 12.00 hours, is fed to the memory 70. The operator then looks through the telescope 12 at the horizon and aligns the horizontal cross hair 12.1 with the horizon to ensure that the instrument is exactly horizontal. Simultaneously, he swings the instrument in a horizontal arc with the object of locating the instrument, the sun and the point on the horizon at which he is looking in the same vertical plane. As the shaft 26 rotates, sunlight is reflected from the mirror 36 onto the mirror 20, and then through the telescope 12 so that it can be seen by the user. This appears to him as a streak of light due to the fact that the mirror 36 is rotating rapidly. In the form described the image of the sun travels across the mirror 20 at a rate of fifty times per second which, obviously, is too rapid for the human eye to detect the difference between successive images. The streak of light seen will only cross the intersection between the cross hairs when the instrument, the sun and the viewed point on the horizon are properly aligned in a vertical plane. If this alignment is not obtained, then the streak will be off-centre to one side or the other of the intersection between the cross hairs and the instrument must be swung horizontally to correct this. Once the user is satisfied that this requirement is met, he closes the switch 56 to take his reading. This is displayed on the unit 48. Immediately after the switch 56 is permitted to move to its other position, the instrument is re-set. The first input pulse received by the block 74 from the unit 18 after the switch 56 is closed is used to start the counter 84, and the next pulse received from the coil 76 is used to stop the counter 84. The reading of the counter 84, when it stops, is stored in the memory 70.

Figure 5:
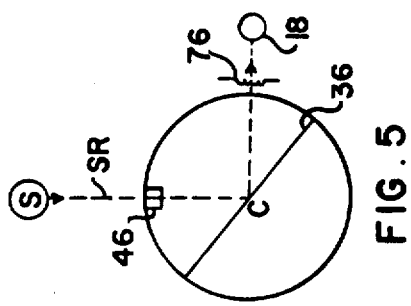
FIGS. 5 and 6 illustrate how sun altitude is determined.
Figure 6:
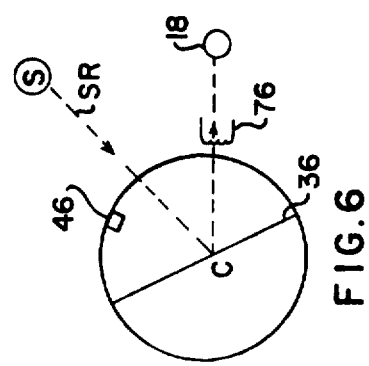

How the two readings stored in the memory 70 (the output of the counter 68 and the output of the counter 84) give sufficient data for a navigational fix to be obtained will best be understood by reference to FIGS. 5 and 6.

In FIG. 6 it is assumed that the sun S is directly overhead so that the sun's rays SR are falling vertically on the instrument. It is also assumed that the centre point C of the mirror 36 and the unit 18 are in the same horizontal plane. Consequently, when the mirror 36 is at 45 degrees with respect to horizontal, light reflected therefrom falls on the unit 18. At this stage the counter 84 is started and it will be noted that the magnet 46 is at the top dead centre position of the shaft 26. The shaft must then rotate through 90 degrees before the coil 76 produces a pulse to switch the counter 84 off. As the motor 44 rotates at a predetermined speed, the time which elapses between the counter 84 being switched on by the pulse from the unit 18 and off when a pulse is received from the coil 76 is proportional to the altitude of the sun, in degrees and minutes, above the horizon. In the further example of FIG. 6, it is assumed that the sun is 45 degrees above the horizon. In this example, the face of the mirror 36 has moved to an angle of 22.5 degrees with respect to vertical to reflect sunlight onto the unit 18 and set the counter 84 running. The magnet 46 is, however, now 22.5 degrees closer to the coil 76 and thus the time which elapses before it reaches the coil is reduced with respect to that required in the preceding example. Again, the elapsed time is a measure of sun angle. When the sun is almost setting, that is, it has travelled through another 45 degrees, the mirror 36 must be vertical to reflect light onto the unit 18. Thus, sun elevation can be determined at a specific time and this in conjunction with navigational tables gives enough information for a positional fix.

In a modified circuit arrangement, the counter 84 is reset to zero each time the coil 76 produces a pulse. Only if the switch 56 is depressed when the coil produces a pulse is the first pulse from the unit 18 reaching the logic block 74 used to stop the counter 84. In this form it is the time taken for the magnet to travel through the reflex angle from the coil 76 to the point at which sun is reflected onto the unit 18 which is measured. On the basis of this information the circuitry can produce an output signal which is representative of the angular displacement of the sun above the horizon. Also, it is not necessary for the coil 76 to be located horizontally with respect to the shaft. Provided the coil is not located in the quadrant which lies between the horizon and the sun when it is vertically overhead, the position of the coil is immaterial as the logic can be constructed to take the position of the coil into consideration.

While, in the description of the operation, it has been assumed that unit 18 is horizontally located with respect to the point C, this is not essential. The logic or the position of the coil 76 can be used to compensate should the unit 18 and point C not be in the same horizontal plane.

The light pulses from the disc 90 falling on the cell 92 are compared, in the block 94, with a frequency derived from the oscillator 62. If there is any discrepancy which indicates that motor is running fast or slow, correction is automatically effected by the control logic of the block 94. The error can be displayed by closing the switch 58, this causing counting to occur from one pulse emerging from the coil 76 to the next. The time which elapses is compared with the output of the oscillator 62, and an indication as to whether or not the motor is running fast or slow is displayed. If the motor speed is accurate, then the read-out obtained will represent exactly 360°00'. The display will read 60°00' as the first figure is of no significance. A higher reading than 60°00' indicates that the motor speed is slow and a lower reading that the motor is running fast. The system including photocell 92 can be replaced by a system including a coil and a magnet, such as described above with reference to coil 76. Similarly, the coil 76 and magnet 46 can be replaced by a photo-electric system.

To detect internal errors in the form of the instrument which measures the reflex angle, it is pointed directly at the sun and a reading taken. If the instrument is exactly accurate then a zero reading will be obtained from the counter 84. If there is any internal error than this will be recorded by the counter, and it can be compensated for in subsequent readings. If the angle between the sun and the horizon is directly measured, then a built-in 'positive error' is needed to enable calibration to be undertaken.

In normal use, several readings will be taken and an average calculated to eliminate operator errors. While not illustrated, there can be means for storing a series of readings and for calculating the average of these readings before displaying the result.

The instrument of FIGS. 1, 2 and 3 can be used for the purposes of obtaining a star shot. However, the unit 18 must then be constituted by an expensive photo-electric device, such as a photomultiplier tube, which can pick up the exceptionally weak incoming light signals. In this regard it must be borne in mind that the brightness of first order magnitude stars have an intensity which is in the order of $10^{10}$ times less than that of the sun.

Figure 7:
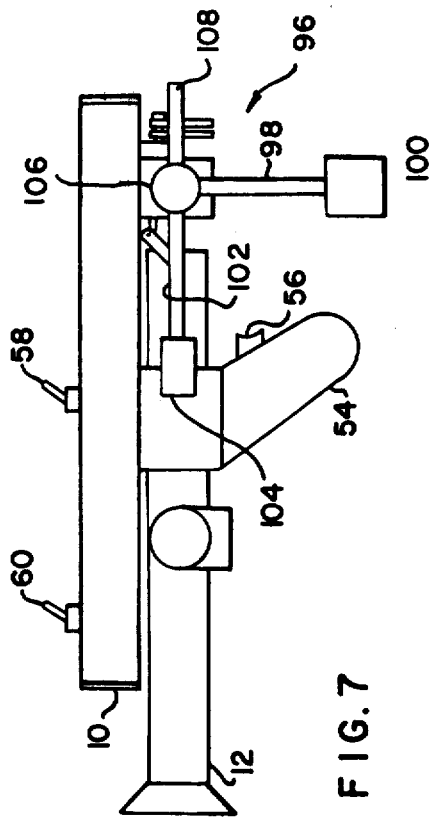
FIG. 7 is a side elevation of a modified instrument.
Figure 8:
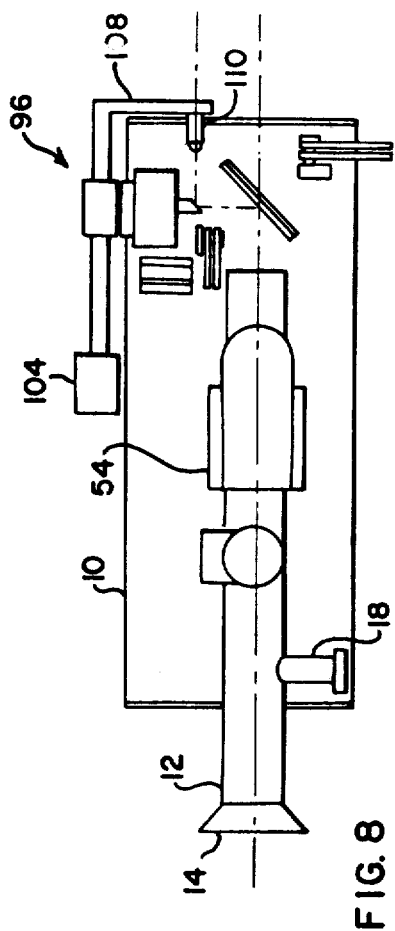
FIG. 8 is an underneath plan view of the instrument of FIG. 7.
Figure 9:
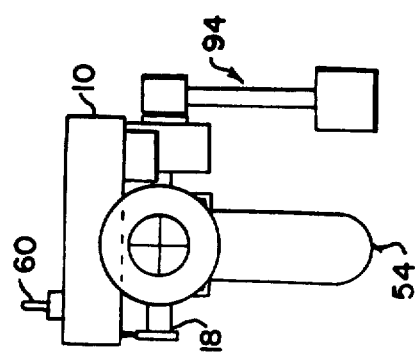
FIG. 9 is a front elevation of the instrument of FIGS. 7 and 8.

Referring now to FIGS. 7, 8 and 9, this shows an instrument which is capable of taking star shots without the use of an expensive photo-electric device. The instrument has many parts in common with the instrument of FIGS. 1 to 3 and, where applicable, like reference numerals have been employed.

In this form of instrument the telescope 12 and the other parts of the optical system are on the underside of the housing 10 rather than on the top of it. The handgrip 54 straddles the telescope 12 and extends downwardly. The switch 56 remains on the handgrip 54 and the switches 58 and 60 are on the top face of the housing 10.

A pendulum structure 96 comprising a vertical arm 98 with a weight 100 at the lower end and a horizontal arm 102 with a counterweight 104 at the outer end thereof is carried by a bearing 106. The axis of the bearing 106 is aligned with the axis of the mirror 36. The counterweight 104 balances out the weight of a cranked arm 108 on the free end of which there is a light source 110. The light source 110 can be the end of a fibre optic light guide which conducts light from a fixed source within the housing 10 thus freeing the assembly from the drag problems of wiring or slip rings associated with direct light sources. The light source 110 shines onto the mirror 36.

The switch 60 must now be a three-position switch, the third position also being 'on' but with an electronically inverted display which can be seen through the mirror 52.

The instrument of FIGS. 7, 8 and 9 is used by pointing the telescope 12 directly at the star the altitude of which is to be determined. The pendulum weight 100 ensures that the arm 98 remains vertical and this ensures in turn that the cranked arm 108 maintains the light source 110 directed horizontally. The elapsed time which is recorded, and which is representative of star altitude, is measured between the artificial horizon constituted by the source 110 and the reference point constituted by the coincidence between the coil 76 and the magnet 46.

Light source 110 need only be energised during the taking of a reading, it being unnecessary and undesirable for the light source to be on while aim is taken at the star. This is because the light source tends to 'drown' the faint light from the star. Alternatively, the source 110 can be an infra red source, outside the range of the human eye, so that, while on constantly, it cannot be seen.

The instrument of FIGS. 7, 8 and 9 has its pendulum structure detachable. The handgrip 54 is constructed to attach in two different positions, i.e. on the top face and the bottom face of the housing so that the instrument can be used one way up for star shots and the other way up, with the pendulum structure removed, for sun shots.

Figure 10:
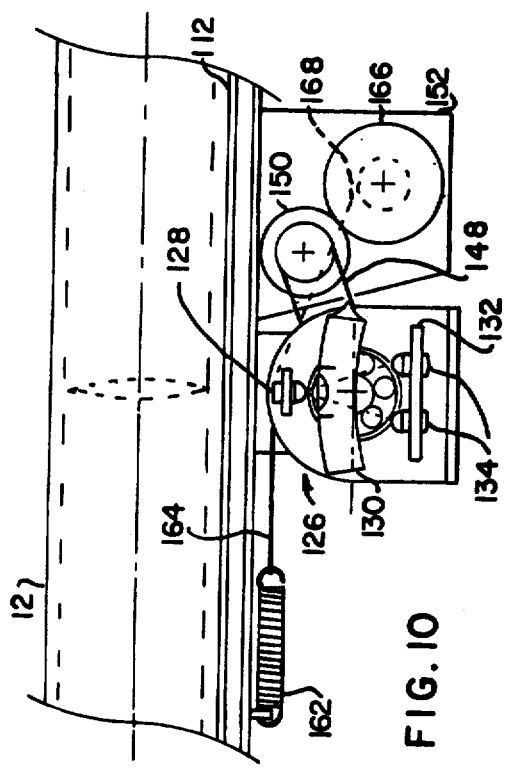
FIG. 10 is a side elevation of part of a further instrument.
Figure 11:
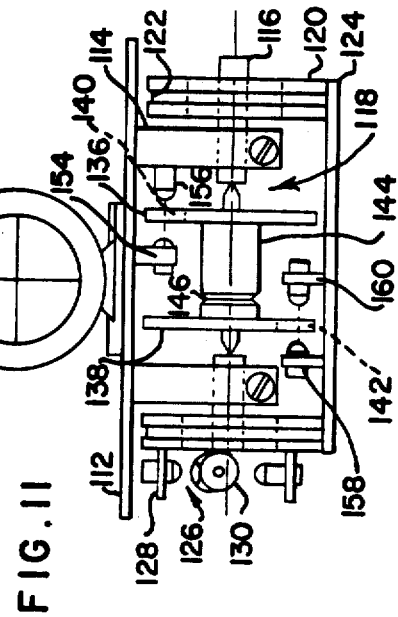
FIG. 11 is a front elevation of the part shown in FIG. 10.

Turning now to FIGS. 10 and 11, these show a further embodiment of the present invention. The telescope is shown at 12 and this is mounted on a platform 112. Pillars 114 depend from the platform 112, the pillars being vertically split and there being two shafts 116 clamped by the pillars 114. A flywheel structure 118 is carried by the shafts 116, there being cup bearings (preferably jewelled cup bearings) for rotatably mounting the flywheel structure 118 on the shafts 116.

Platform supports 120 are rotatably mounted on the shafts 116. This is achieved by securing the inner race of a ball race to each shaft 116 and the outer race of each ball race to one of the supports 120. Each support has the configuration best seen in FIG. 10 with a curved upper surface having a groove 122 (FIG. 11) therein.

A hanging platform 124 is secured to the supports 120.

A levelling arrangement 126 is mounted on the left hand support 120. This arrangement comprises a light source 128 which shines down onto the bubble in a spirit level 130. Below the spirit level 130 is a member 132 on which two photo-transistors 134 are mounted.

The flywheel structure 118 comprises a first flywheel 136 and a second flywheel 138. The flywheel 136 has a slot 140 in the periphery thereof and the flywheel 138 has a slot 142 in the periphery thereof. These slots are 180° displaced from one another.

Between the flywheels 136 and 138 the shaft 144 of the flywheel structure 118 has a groove 146 therein which receives a drive belt 148, the belt 148 being driven by a motor 150 which is itself mounted on a support 152.

A photo-transistor 154 is mounted on the underside of the platform 112 and a light source 156 is mounted on the right hand pillar 114. It will be noted that the flywheel 136 is between the photo-transistor 154 and the light source 156. Similarly, a photo-transistor 158 and a light source 160 are mounted on the platform 124. The photo-transistor 158 and the light source 160 are on opposite sides of the flywheel 138.

A spring 162 is mounted on the underside of the platform 112 and a cord 164 extends from the spring into one of the grooves 122, the spring being anchored to the support 120. A motor 166 is carried on the support 152 and a cord 168 extends from this motor to the other of the grooves 122. The cord 168 is anchored in the respective groove.

Figure 12:
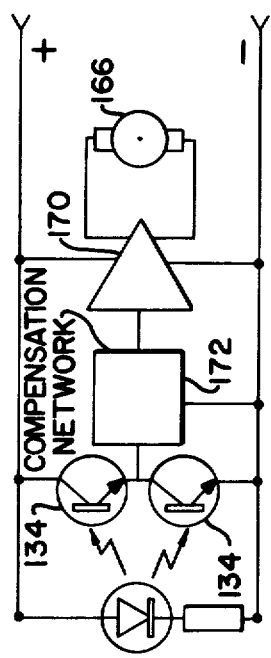
FIG. 12 is a circuit diagram.

Referring now to FIG. 12, the photo-transistors 134 are connected into a bridge circuit which includes an amplifier 170 and a compensation network 172. The output of the amplifier 170 is fed to the motor 166.

When the front of the telescope 12 is raised to point it at a star, the bubble of the spirit level 130 moves to the right as viewed in FIG. 10. The bubble partially obscures the right hand photo-transistor 134 and casts a faint shadow on that photo-transistor. The input to the amplifier 170 goes negative and power is applied to the motor 166 causing it to wind up its cord thus tilting the platform 124 against the pull of the spring 162. The motor 166 continues to pull until the photo-transistors 134 are evenly illuminated by the light source 128. Thus the platform 124 remains horizontal.

With the telescope horizontal it will be appreciated that the photo-transistors 154 and 158 are illuminated simultaneously as the slots 140 and 142 are diametrically opposed. When the instrument is tilted, the photo-transistor and light source mounted on the platform 124 will remain at their bottom dead centre position. However, the photo-transistor 154 and light source 156 will have swung in an arc about the axis of the flywheel structure. They are thus no longer at the top dead centre and their position is a measure of the angle through which the instrument has been tilted.

The method of operation is by starting the count when the photo-transistor 154 is illuminated by the light source 156 through the slot 140 and stopping the count when the photo-transistor 158 is illuminated by the light source 160 through the slot 142.

I claim:

1. A navigational instrument for determining the angle of elevation of the sun, the instrument comprising a rotatable structure including means for producing a reference signal each time that a specific part of the rotatable structure passes a reference point; photo-sensitive means for generating an indicator signal when light from the sun falls on it; image-forming means, forming part of said rotatable structure, for causing a succession of images of the sun to fall onto the photo-sensitive means, thus causing a succession of indicator signals to be generated by said photo-sensitive means; means for detecting the time interval between an indicator signal and a reference signal and for generating a signal proportional to said interval; a telescope through which the horizon and the image produced by said image-forming means can be viewed to enable a user to place the axis of the telescope, the sun and the point on the horizon at which he is looking in the same vertical plane; and manually operable switch means for causing said signal proportional to said time interval to be generated.

2. A navigational instrument according to claim 1 which is additionally capable of determining the angle of elevation of a star; the instrument further including a light source, said light source and said photo-sensitive means forming part of an assembly which is pivotal with respect to the telescope and which assembly includes means for maintaining the line of sight from said source to said photo-sensitive means in a horizontal plane when said telescope is tilted to point it at a star, said light source and said image forming means being positioned so that when said light source is switched on, a succession of images of the light source fall onto the photo-sensitive means, thus causing a succession of indicator signals to be produced.

3. An instrument according to claim 2, in which a pendulum forms the means for maintaining the line of sight from said source to said photo-sensitive means in a horizontal plane.

4. A navigational instrument according to claim 1, 2 or 3 and which includes a counter connected to receive the indicator signals and the reference signals, counting commencing upon receipt of the first indicator signal after the switch means is closed and terminating upon receipt of the first reference signal after counting has commenced.

5. A navigational instrument for determining the angle of elevation of a celestial body, the instrument being based on three input signals from: (a) a telescope, (b) a first signal-producing means, and (c) a second signal-producing means, and comprising a structure which includes a first part and a second part, pivotal means connecting said parts to one another, the telescope having a body part and an optical system for producing a visible image of the celestial body, said body part being mounted on said first part and the optical system including an eyepiece through which the image of the celestial body can be viewed, thus permitting the telescope to be manually trained on the celestial body, means for maintaining said second part horizontal when the telescope is tilted with respect to said second part about said pivotal means, a rotatable structure having the first signal-producing means for producing a reference signal each time that a specific part of said rotatable structure passes a reference point on said second part and the second signal-producing means, said second signal producing means being independent of said optical system but linked for pivoting with said body part and thus displacable with respect to the first signal-producing means about the axis of rotation of the rotatable structure when the first part and the body part are tilted with respect to the second part and for producing a series of indicator signals, means for detecting the time interval between an indicator signal and a reference signal and for generating a signal representative of the angle of elevation of the celestial body and proportional to said interval, and manually-operable switch means for causing said signal proportional to said time interval to be generated.

* * * * *